(12) United States Patent
Wu et al.

(10) Patent No.: US 9,008,249 B2
(45) Date of Patent: Apr. 14, 2015

(54) DETECTION AND FILTERING OF AN UNDESIRED NARROWBAND SIGNAL CONTRIBUTION IN A WIRELESS SIGNAL RECEIVER

(75) Inventors: Jie Wu, San Diego, CA (US); Emilija M. Simic, La Jolla, CA (US); Timothy Paul Pals, San Diego, CA (US); Duong A. Hoang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/371,311

(22) Filed: Feb. 10, 2012

(65) Prior Publication Data

US 2013/0208838 A1    Aug. 15, 2013

(51) Int. Cl.
*H04B 1/10* (2006.01)
*G01S 19/21* (2010.01)

(52) U.S. Cl.
CPC .............. *G01S 19/21* (2013.01); *H04B 1/1036* (2013.01)

(58) Field of Classification Search
CPC ................. H04L 27/2647; H04L 2025/03414; H04L 25/0228; H04L 25/0212; H04B 1/707; H04B 1/7097; H04B 1/71072; H04B 7/15585; H04B 1/7115; H04B 1/7117; H04B 1/712; H04B 1/7107
USPC .................. 375/350, 148, 150, 347; 455/307; 708/300; 342/357; 370/210
See application file for complete search history.

(56) References Cited

U.S. PATENT DOCUMENTS

| | | |
|---|---|---|
| 5,107,227 A | 4/1992 | Brooks |
| 5,325,204 A | 6/1994 | Scarpa |
| 5,519,890 A | 5/1996 | Pinckley |
| 5,848,164 A | 12/1998 | Levine |

(Continued)

FOREIGN PATENT DOCUMENTS

| | | | | |
|---|---|---|---|---|
| CN | 101521517 A | 9/2009 | | |
| EP | 2096769 A1 * | 9/2009 | ............... | H04B 1/10 |

(Continued)

OTHER PUBLICATIONS

Sichum Wang, Robert Inkol, Sreeraman Rajan and Francois Patenaude; "FFT Filter-Bank-Based Wideband Detection: Coherent vs. Non-Coherent Intergration" Instrumentation and Measurement Technology Conference, 2009. I2MTC '09. IEEE, May 5-7, 2009.*

(Continued)

*Primary Examiner* — Daniel Washburn
*Assistant Examiner* — Amneet Singh
(74) *Attorney, Agent, or Firm* — Berkeley Law & Technology Group, LLP

(57) ABSTRACT

Techniques are provided which may be implemented using various methods and/or apparatuses in a device comprising a receiver to scan a spectral band of a received signal comprising a desired signal contribution to determine whether signal data associated with at least a sub-band of the spectral band further comprises at least one undesired signal contribution. In response to determining that the signal data comprises at least one undesired signal contribution, the mobile station may initiate at least one notch filter to affect the undesired signal contribution in subsequent signal data associated with the received signal.

82 Claims, 5 Drawing Sheets

(56) References Cited

U.S. PATENT DOCUMENTS

| | | | |
|---|---|---|---|
| 6,961,019 | B1 | 11/2005 | McConnell et al. |
| 7,058,116 | B2* | 6/2006 | Moshavi et al. ............... 375/148 |
| 7,107,033 | B2 | 9/2006 | du Toit |
| 7,250,887 | B2 | 7/2007 | Danzig et al. |
| 7,292,830 | B1 | 11/2007 | Cheung et al. |
| 7,720,134 | B2* | 5/2010 | Tomasin et al. ............... 375/148 |
| 7,809,094 | B2 | 10/2010 | Xu et al. |
| 7,924,904 | B2 | 4/2011 | Gaikwad et al. |
| 8,031,101 | B2 | 10/2011 | Narasimhan et al. |
| 8,055,235 | B1 | 11/2011 | Gupta et al. |
| 8,774,330 | B2 | 7/2014 | Dubey et al. |
| 2002/0065047 | A1* | 5/2002 | Moose ............................ 455/63 |
| 2002/0130811 | A1 | 9/2002 | Voigtlaender et al. |
| 2002/0173317 | A1* | 11/2002 | Nykanen et al. ............... 455/456 |
| 2003/0103445 | A1* | 6/2003 | Steer et al. ..................... 370/208 |
| 2003/0112905 | A1* | 6/2003 | Heinzl et al. ................... 375/350 |
| 2005/0059366 | A1 | 3/2005 | Choi et al. |
| 2005/0285781 | A1 | 12/2005 | Park et al. |
| 2006/0133463 | A1* | 6/2006 | Pietila et al. ................... 375/150 |
| 2006/0203710 | A1* | 9/2006 | Mukkavilli et al. ........... 370/208 |
| 2006/0269004 | A1 | 11/2006 | Ibrahim et al. |
| 2006/0281425 | A1 | 12/2006 | Jungerman |
| 2007/0153878 | A1* | 7/2007 | Filipovic ........................ 375/147 |
| 2007/0296590 | A1 | 12/2007 | Diorio et al. |
| 2008/0043580 | A1 | 2/2008 | Otaka et al. |
| 2008/0143580 | A1 | 6/2008 | Glazko et al. |
| 2008/0146184 | A1 | 6/2008 | Dessert |
| 2008/0160916 | A1* | 7/2008 | Jagger et al. .................. 455/63.1 |
| 2009/0190633 | A1 | 7/2009 | Smith |
| 2009/0191866 | A1* | 7/2009 | Flore et al. ..................... 455/434 |
| 2009/0238306 | A1* | 9/2009 | Honda et al. ................... 375/329 |
| 2009/0257471 | A1* | 10/2009 | Tanaka et al. .................. 375/130 |
| 2009/0259439 | A1 | 10/2009 | Feldhaus et al. |
| 2010/0013706 | A1 | 1/2010 | Sun |
| 2010/0026547 | A1 | 2/2010 | Weissman et al. |
| 2010/0118921 | A1* | 5/2010 | Abdelmonem et al. ....... 375/148 |
| 2010/0158149 | A1* | 6/2010 | Gorokhov ...................... 375/260 |
| 2010/0197235 | A1 | 8/2010 | Wilhelmsson |
| 2010/0234021 | A1* | 9/2010 | Ngai et al. ..................... 455/433 |
| 2010/0246635 | A1* | 9/2010 | Ye et al. ......................... 375/130 |
| 2010/0279637 | A1* | 11/2010 | Umatt ........................ 455/161.2 |
| 2010/0285769 | A1* | 11/2010 | Conroy et al. ................. 455/318 |
| 2011/0142100 | A1* | 6/2011 | Farmer et al. .................. 375/148 |
| 2011/0164701 | A1* | 7/2011 | Nikopourdeilami et al. .. 375/295 |
| 2011/0268206 | A1* | 11/2011 | Ge et al. ......................... 375/260 |
| 2011/0305306 | A1* | 12/2011 | Hu et al. ......................... 375/350 |
| 2012/0042193 | A1 | 2/2012 | Gupta et al. |
| 2014/0140440 | A1 | 5/2014 | Sun et al. |

FOREIGN PATENT DOCUMENTS

| | | |
|---|---|---|
| JP | 2009206603 A | 9/2009 |
| WO | WO-2008133751 A2 | 11/2008 |

OTHER PUBLICATIONS

Milstein, L.B.; "Interference rejection techniques in spread spectrum communications" Proceedings of the IEEE, Jun. 1988 vol. 76, issue: 6, pp. 657-671.*

International Search Report and Written Opinion—PCT/US2013/023656—ISA/EPO—May 7, 2013.

Giordanengo, Giorgio. Impact of Notch Filtering on Tracking Loops for GNSS Applications, Gennaio, 2009, 80 Pages.

* cited by examiner

DETECTION AND FILTERING OF AN UNDESIRED NARROWBAND SIGNAL CONTRIBUTION IN A WIRELESS SIGNAL RECEIVER

BACKGROUND

1. Field

The subject matter disclosed herein relates to wireless signal receivers, and more particularly to methods and apparatuses for use in detecting and filtering one or more undesired signal contributions that may interfere with the reception of one or more desired signals.

2. Information

Global navigation satellite systems (GNSS), such as the Global Positioning System (GPS), Galileo and the like, rely on an ability of a terrestrial navigation receiver to process a signal from a satellite position system ("SPS signal") usually transmitted from transmitters fixed to space vehicles (SVs) to obtain pseudorange measurements from the navigation receiver to the transmitters. With pseudorange measurements to a sufficient number of transmitters and knowledge of locations of the transmitters, the navigation receiver may estimate its location.

An SPS signal may be encoded with a repeating sequential code. For example, SPS signals and other known communication signals may be transmitted and received using spread spectrum techniques (e.g., based on direct sequence spread spectrum (DSSS) modulation, direct-sequence code division multiple access (DS-CDMA) modulation, etc.). In one implementation, a receiver may attempt to determine a pseudorange measurement from a received SPS signal based, at least in part, on a detected code phase associated with the received SPS signal. Here, for example, such a receiver may detect such a code phase based upon a location of an energy peak detection within a code phase search window. However, given the weakness of SPS signals received from SVs at a long range, and the presence of multipath and noise, obtaining pseudorange measurements may be particular challenging at a mobile station such as a cellular phone given limited battery life and processing capability. Other communication signals and receivers may also exhibit similar characteristics or otherwise be affected in a multipath and/or noisy signaling environment.

In addition to overcoming multipath and noise, a receiver may also need to overcome undesired RF energy (e.g., a "jammer" signal) in or around the frequency band of an expected SPS signal (e.g., L1 at 1575.42 MHz (10.23 MHz× 154) and L2 at 1227.60 MHz (10.23 MHz×120) for a GPS signal). Such undesired RF energy may be generated by other "transmitters" either intentionally or unintentionally. One such other transmitter may include any one of several sources of RF energy such as, for example, a transmitter on the mobile station for transmitting voice or data in a wireless communication network. With knowledge of characteristics of an undesired signal (e.g., carrier frequency, bandwidth, power level, etc.), a receiver may apply a notch filter to remove or substantially attenuate energy from an undesired signal in a received signal in processing an SPS signal and/or other communication signal.

In one implementation, a receiver at a mobile station may store or maintain a database of characteristics of different undesired signals that may be encountered in processing signals. Using such characteristics stored in a database, a receiver may program one or more notch filters to remove or attenuate the undesired signals. Information in such a database may be obtained using some "brute force" technique(s), e.g., by exhaustively profiling potential interfering signals in a wide area network (WAN) channel, and building a table of undesired signal carrier frequencies in a radio frequency driver of a navigation receiver. Disadvantageously, building such a database may be time consuming and/or may potentially inflate a driver code size beyond a tolerable level. Also, such a table may not be capable of addressing undesired signals from certain external sources and/or sporadically encountered/transmitted signals.

SUMMARY

In accordance with an aspect, a method may comprise, at a device comprising a receiver: scanning at least one sub-band of a plurality of sub-bands within a spectral band of a received signal comprising a desired signal contribution to determine whether signal data associated with the at least one sub-band further comprises at least one undesired signal contribution; and in response to determining that the signal data in the at least one sub-band comprises the at least one undesired signal contribution, initiating at least one notch filter within a receiver to affect the at least one undesired signal contribution in subsequent signal data associated with the received signal.

In accordance with another aspect, an apparatus may comprise: means for scanning at least one sub-band of a plurality of sub-bands within a spectral band of a received signal comprising a desired signal contribution to determine whether signal data associated with the at least one sub-band further comprises at least one undesired signal contribution; and means for initiating at least one notch filter within a receiver to affect the at least one undesired signal contribution in subsequent signal data associated with the received signal, in response to determining that the signal data in the at least one sub-band comprises the at least one undesired signal contribution.

In accordance with yet another aspect, a device may comprise: a radio frequency (RF) front-end to receive a signal; a baseband processor to establish signal data associated with the received signal; and at least one processing unit to: scan at least one sub-band of a plurality of sub-bands within a spectral band of a received signal comprising a desired signal contribution to determine whether signal data associated with the at least one sub-band further comprises at least one undesired signal contribution; and in response to determining that the signal data in the at least one sub-band comprises the at least one undesired signal contribution, initiate at least one notch filter within a receiver to affect the at least one undesired signal contribution in subsequent signal data associated with the received signal.

In accordance with still another aspect, an article of manufacture may comprise: a non-transitory computer readable medium having stored therein computer-implementable instructions executable by one or more processing units of a device to: scan at least one sub-band of a plurality of sub-bands within a spectral band of a received signal comprising a desired signal contribution to determine whether signal data associated with the at least one sub-band further comprises at least one undesired signal contribution; and in response to determining that the signal data in the at least one sub-band comprises the at least one undesired signal contribution, initiate at least one notch filter within a receiver to affect the at least one undesired signal contribution in subsequent signal data associated with the received signal.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
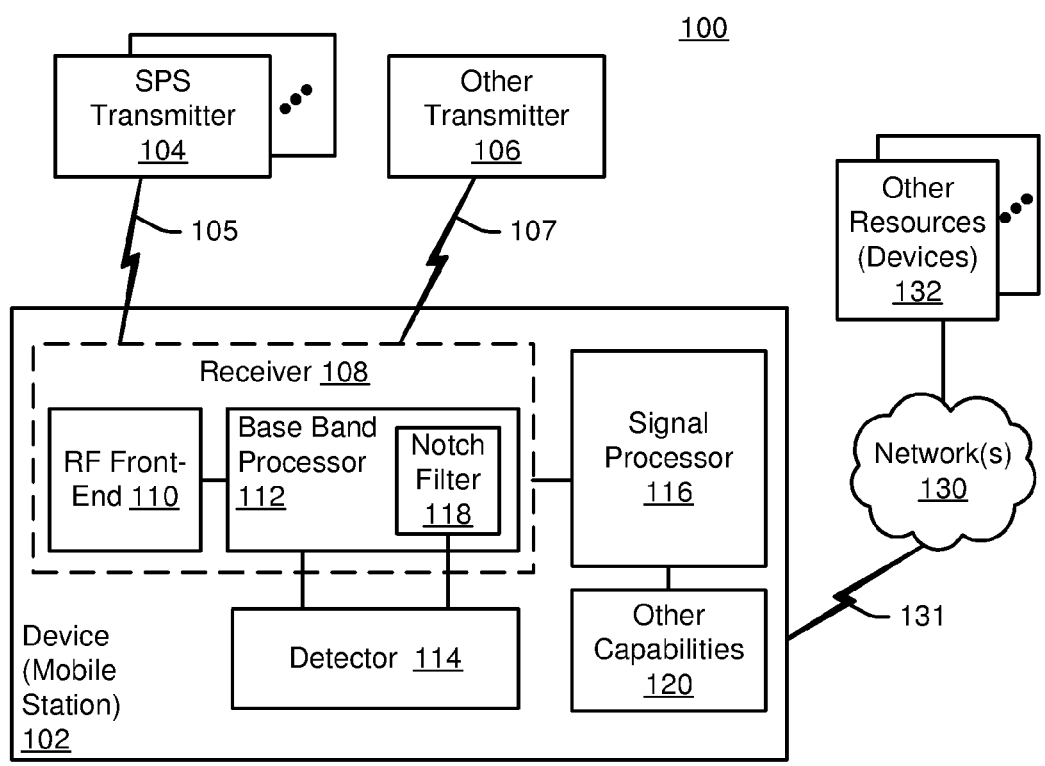
FIG. 1 is a schematic block diagram illustrating an example environment that includes a device in the form of a mobile station having a receiver coupled to a detector that is capable of detecting and filtering one or more undesired signals that may interfere with the reception of one or more desired signals, in accordance with an implementation.

In accordance with certain aspects, example techniques are provided which may be implemented using various methods and/or apparatuses in an electronic device (e.g., a mobile station, a receiver, etc.) to detect and filter one or more undesired signals that may interfere with the reception of one or more desired signals. Such methods and/or apparatuses may further act in some manner to affect signal data associated with a detected undesired signal. Although the example techniques described herein are illustrated using spread spectrum receiver, it should be kept in mind that the techniques provided herein may be implemented in various different types of wireless signal receiver's, which spread spectrum receivers represent one example.

For example, as illustrated in certain examples described herein, a detector may be provided to selectively sample a portion of signal data being processed by a receiver and to detect one or more undesired signal contributions therein. Such a detector may, for example, identify one or more parameters associated with a detected undesired signal contribution. For example, a parameter may identify an estimated center (carrier) frequency, an estimated power, and/or an estimated bandwidth associated with a detected undesired signal contribution.

A receiver may then be instructed or otherwise operatively affected to process subsequent signal data in some manner to possibly reduce interference and/or other deleterious effects relating, at least in part, to a detected undesired signal contribution. By way of example, in certain implementations a programmable notch filter or the like in a filtering stage of a baseband processor may be programmed based, at least in part, on one or more parameters associated with a detected undesired signal contribution.

Thus, for example, a device having a receiver and detector, as presented above and described in greater detail herein, may employ the detector to scan at least one sub-band of a plurality of sub-bands within a spectral band of a received signal comprising a desired signal contribution to determine whether signal data associated with the sub-band might also comprise at least one undesired signal contribution (e.g., a jammer). In response to determining that the signal data in the sub-band comprises at least one undesired signal contribution, at least one notch filter within the receiver may be initiated to affect the undesired signal contribution in subsequent signal data associated with the received signal. In certain example implementations, a detector may be provided in a device to set a bandwidth of one or more of the plurality of sub-bands.

A detector may further generate integration data by performing coherent integration, non-coherent integration, or both using sample data. Such a detector may then, for example, perform peak processing or other like estimation process based, at least in part, on the integration data. Thus, for example, one or more candidate peaks possibly associated with one or more undesired signal contributions may be identified and compared to one or more threshold values to determine whether a detected undesired signal contribution may be associated with one or more peaks.

As presented in greater detail below, in certain implementations, signal data may be selectively sampled or otherwise obtained by a detector at one or more different processing stages in one or more receivers. For example, in one receiver, signal data may be selectively obtained either before or after an initial processing stage that precedes a filtering stage comprising at least one notch filter. For example, in one receiver, signal data may be obtained either before or after a filtering stage comprising at least one notch filter.

In certain example implementations, with a mobile station comprising two or more receivers, signal data may be selected by a shared or common detector from a particular receiver.

In certain example implementations, it may be beneficial to selectively activate a detector, e.g., in response to one or more triggering events. Here, for example, a triggering event may occur upon a device initiation or a session initiation event and/or upon a new signaling channel initiation event (e.g., for a new channel of the receiver, for a new channel for an aggressor transmitter, etc.). A triggering event may, for example, occur in response to time-based event (e.g., a timer, an age, etc.). A triggering event may, for example, relate to a frequency drift event (e.g., relating to an amount of oscillator drift, etc.). A triggering event may, for example, relate to some initiated scan event, such as, e.g., input generated by some other feature of the mobile station or other device and/or user. A triggering event may occur through an application programming interface (API) and/or the like, which may, for example, be exposed to an application layer, etc. In yet another example, a triggering event may relate to a signal data threshold event, such as, e.g., a received signal magnitude or the like exceeding a threshold. In certain example implementations, it may be beneficial to periodically or otherwise from time to time activate a detector for performing a jammer scan. Such scheduling may be programmable in certain instances.

In certain example implementations, a method may be provided for use at a device comprising a receiver, which includes scanning at least one sub-band of a plurality of sub-bands within a spectral band of a received signal comprising a desired signal contribution to determine whether signal data associated with the at least one sub-band further comprises at least one undesired signal contribution, and in response to determining that the signal data in the at least one sub-band comprises the at least one undesired signal contribution, initiating at least one notch filter within a receiver to affect the at least one undesired signal contribution in subsequent signal data associated with the received signal.

As illustrated by the various examples herein, such a method and/or device may, e.g. as part of the scanning process/capability selectively set one or more of a bandwidth of one or more of the plurality of sub-bands, a center frequency of one or more of the plurality of sub-bands, an integration time for one or more of the plurality of sub-bands, and/or the like or some combination thereof relating to one or more of the plurality of sub-bands, etc.

In certain example implementations, such an example scanning process may comprise selecting at least one sub-band, and estimating a center frequency associated with at least one undesired signal contribution. In certain instances, such an example scanning process may further rise selecting at least one sub-band, collecting signal samples in the selected sub-band, applying Fourier analysis to the signal samples to generate a power spectrum for the selected sub-band, and applying peak processing to the power spectrum to estimate one or more parameters associated with the at least one undesired signal contribution in the selected sub-band. A power spectrum for a given signal may, for example, provide a plot of a portion of a signal's power (e.g., energy per unit time) for given frequency bins.

In certain implementations, in estimating a center frequency a device may, for example, non-coherently combine one or more power spectra for the at least one sub-band, and apply a threshold to the combined power spectra.

In certain example implementations, in scanning a device may perform scanning for one or more of the plurality of sub-bands based on a defined order. For example, in certain implementations a defined order may be based, at least in part, on a difference of respective center frequencies of each of the plurality of sub-bands from a center frequency of the spectral band.

In accordance with certain example implementations, at least two of the plurality of sub-bands are at least partially overlapping.

In accordance with certain example implementations at least two of the plurality of sub-bands have different center frequencies and equal bandwidth sizes.

In certain example implementations, a device may store information regarding one or more detected undesired signal contributions, such as, one or more parameters, in a memory (e.g., a volatile memory, a non-volatile memory) such that a notch filter may be subsequently programmed based, at least in part, on the stored parameter. In certain example instances, a device may transmit or otherwise provide such information and/or parameters to one or more other devices. In certain example implementations, a device may also transmit or otherwise provide its current estimated position or location to such other device(s).

As illustrated in the examples below, in certain instances, a desired signal contribution may comprise one or more satellite positioning system (SPS) signals and an undesired signal contribution may be associated with a continuous wave signal or other like narrow-band signal that interferes with reception of the SPS signal. Such a continuous wave signal may, for example, emanate from a source that is internal or external to the device. However, it should be recognized that claimed subject matter is not necessarily limited to SPS signals and/or SPS receivers, as the techniques provided herein may be applied for various other types of signals, receivers, and/or signal processing capabilities. Furthermore, while certain example implementations use a device in the form of a mobile station, other electronic device may also be used.

Attention is drawn now to FIG. 1 which is a schematic block diagram illustrating an example environment 100 that includes a device in the example form of a mobile station 102 having a receiver 108 coupled to a detector 114 that is capable of detecting one or more undesired signals (e.g., a continuous wave signal 107) which may interfere with the reception of one or more desired signals (e.g., SPS signal 105).

In this example, environment 100 comprises a plurality of SPS transmitters 104. For example, an SPS may comprise one or more Global Navigation Satellite Systems (GNSS), regional navigation systems, etc. As illustrated an SPS transmitter 104 may transmit an SPS signal 105 to mobile station 102. An SPS transmitter 104 may comprise a satellite and/or terrestrial transmitter (e.g., a "pseudolite", or other like SPS augmentation device).

In this example, mobile station 102 is representative of any portable electronic device. By way of example but not limitation, mobile station 102 may comprise a computing and/or communication device such as a mobile telephone, a Smart Phone, a lap top computer, a tablet computer, a wearable computer, a personal digital assistant, a navigation device, a tracking device, etc. Mobile station 102 may, for example, perform and/or otherwise support various navigation functions (e.g., position estimation, velocity estimation, time estimation, tracking, routing, location based services, etc.) based, at least in part, on one or more SPS signals.

Here, for example, mobile station 102 may receive an SPS signal 105 via receiver 108 which may comprise an RF front-end 110 and baseband processor 112. As shown, baseband processor 112 may comprise a notch filter 118. In this example, detector 114 may interface with baseband processor 112 and affect operation of a notch filter module comprising one or more notch filters 118. In this example, receiver 108 may establish filtered signal data that may be further processed and/or otherwise used in some manner by a signal processor 116 and/or other capabilities 120. For example, signal processor 116 may use filtered signal data to estimate a position, location, range, velocity, and/or other like information that may be of use in providing positioning or navigation services to a user of mobile station 102 or other devices or entities. Thus, for example, other capabilities 120 may comprise a displaying capability that presents mapping or routing information to a user via some output device (not shown), and/or a network interface capability that provides communication between mobile station 102 and one or more other resources (devices) 132, e.g., via a communication link 131 with one or more wired and/or wireless networks 130.

Here, for example, other resources (devices) 132 may comprise one or more servers, a cloud computing service, or other like computing devices/services. Here, for example, network(s) 130 may comprise a telephone network, a cellular telephone network, a local area network, a wireless local area network, an intranet, the Internet, etc., as well as combinations of network types.

In certain example implementations, mobile station 102 and/or resources 132 may be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

It should be recognized that communication link 131 shown in FIG. 1, may comprise one or more wireless communication links and/or one or more non-wireless communication links (e.g., with signals transmitted using one or more wires, fibers, etc.), and that such communication link 131 and/or network(s) 130 may also represent various supporting devices and/or technologies associated therewith.

Other transmitter 106 as illustrated in FIG. 1 is representative of one or more transmitting devices and/or circuits from which continuous wave signal 107 may be transmitted at certain times. In this example, continuous wave signal 107 may interfere in some manner with SPS signal 105. Thus, as previously mentioned, received signal data may comprise a desired signal contribution (here, e.g., associated with SPS signal 105) and an undesired signal contribution (here, e.g., associated with continuous wave signal 107). As such, in an example implementation, detector 114 may be operatively arranged to sample signal data from baseband processor 112, detect an undesired signal contribution therein, and to affect operation of at least one notch filter 118 accordingly to reduce deleterious effects that such undesired signal contribution may present to receiver 108, signal processor 116, and/or other capabilities 120 with regard to a desired signal contribution. Thus, for example, in certain instances it may be possible to substantially attenuate or remove such undesired signal contribution in subsequently received signal data using a properly applied notch filter.

It should be noted that, while other transmitter 106 is illustrated in FIG. 1 as being externally located to mobile station 102, in other example implementations such other transmitter 106 may be internal to mobile station 102. For example, a circuit (not shown) in mobile station 102 may intentionally or unintentionally transmit an RF signal that interferes with SPS signal 105 or some other desired signal contribution.

Figure 2:
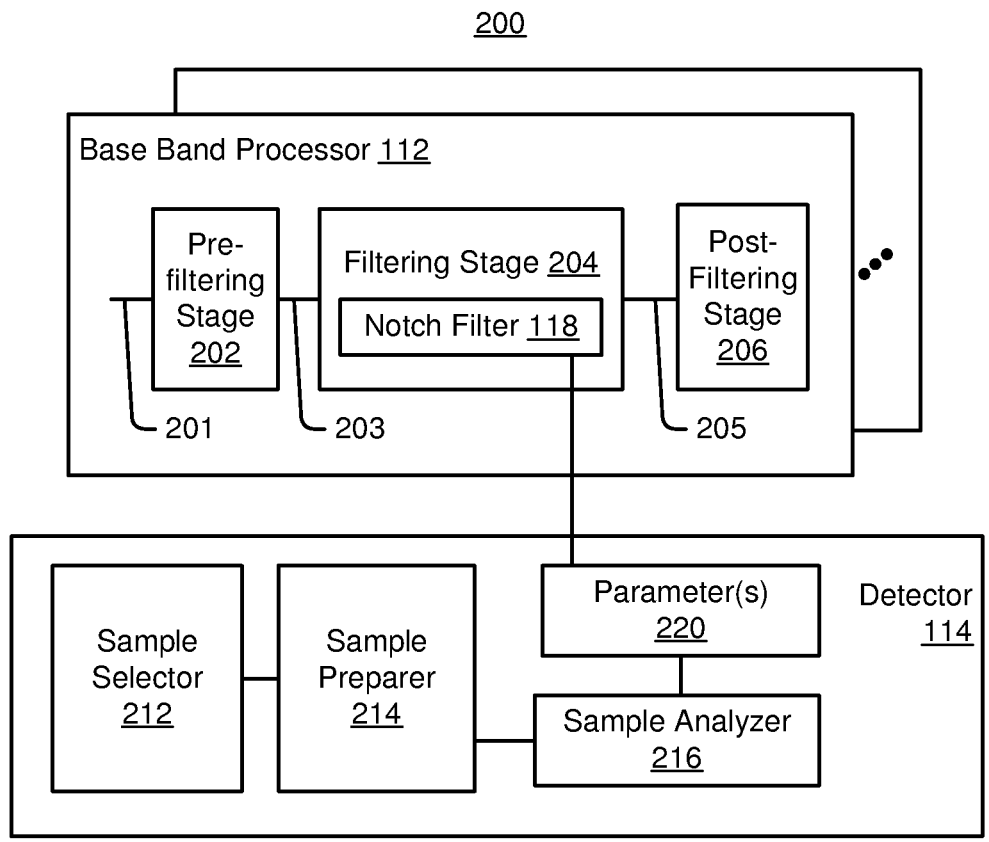
FIG. 2 is a schematic block diagram illustrating certain features of an example receiver and detector, as in FIG. 1, in accordance with an implementation.

Attention is drawn next to FIG. 2, which is a schematic block diagram illustrating certain example features 200 that may be implemented in baseband processor 112 and detector 114, in accordance with certain implementations.

Baseband processor 112 may comprise, for example, a pre-filtering stage 202, a filtering stage 204, and a post-filtering stage 206. Here, for example, signal data from RF front-end 110 (FIG. 1) may be obtained and processed by pre-filtering stage 202, e.g., to provide channel equalization and/or make other changes to the signal data. The resulting signal data from pre-filtering stage 202 may be obtained and processed by filtering stage 204, which as illustrated in FIG. 2 may employ one or more notch filters 118 and/or make still other changes to the signal data. The resulting signal data from filtering stage 204 may be obtained and further processed by post-filtering stage 206, e.g., to provide further signal adjustments.

Figure 3:
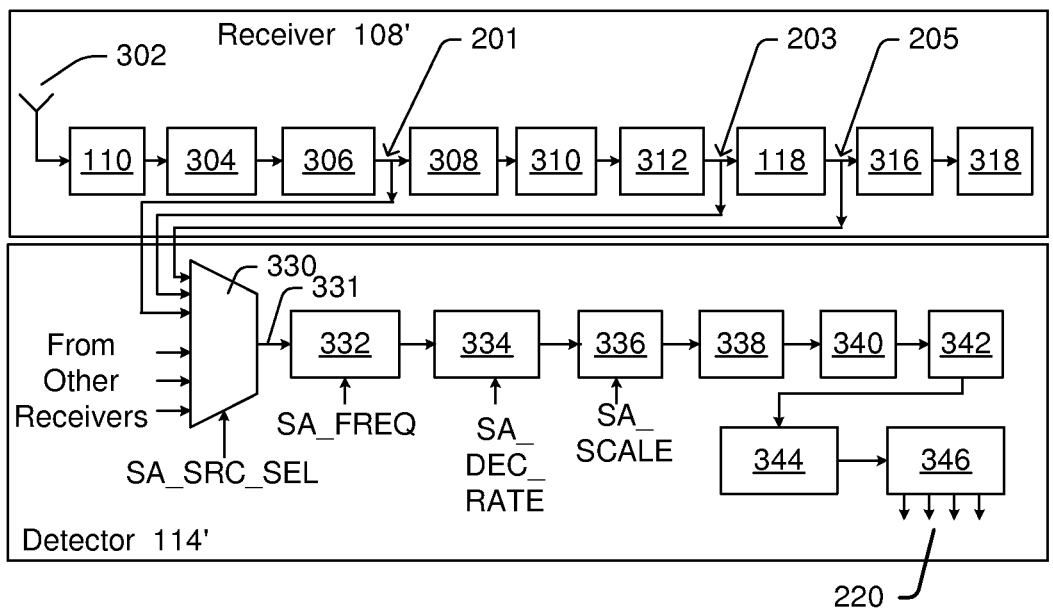
FIG. 3 is a schematic block diagram illustrating certain further features of an example receiver and detector, as in FIG. 1, in accordance with an implementation.

It should be recognized that in certain implementations there may be additional signal filtering provided in pre-filtering stage 202, filtering stage 204, and/or post-filtering stage 206. For example, as illustrated in FIG. 3, a pre-filtering stage may comprise a pre-notch filter 308.

It should be recognized that in certain implementations a receiver may have a baseband processor with fewer or more identifiable stages. The reason that three stages are identified in the example implementation illustrated in FIG. 2 is to show that detector 114 may affect a stage having a notch filter 118 (here, filtering stage 204) based on signal data that may be sampled at different processing points. For example, signal data may be sampled by detector 114 prior to pre-filtering stage 202 at point 201, prior to filtering stage 204 at point 203, and/or prior to post-filtering stage 206 at point 205.

With this in mind, in certain example implementations, detector 114 may comprise a sample selector 212 that may select signal data for sampling at a particular point in the processing of such signal data by baseband processor 112. In certain instances, detector 114 may be shared or otherwise commonly used to support a plurality of receivers, etc., and as such sample selector 212 may also select signal data for sampling from a particular one of the receivers.

Once the signal data has been sampled, or such sample otherwise obtained, by detector 114 all or part of the sampled signal data may be further processed in some manner by sample preparer 214. For example, sampled signal data may represent a spectral band which sample preparer 214 may separate into corresponding signal data for a plurality of selected sub-bands. Thus, in certain example implementations, sample preparer 214 may perform frequency conversion, filtering, and/or scaling of sampled signal data as may be useful to generate prepared signal data for use by a sample analyzer 216.

Sample analyzer 216 may, for example, perform frequency analysis using the prepared signal data for one or more sub-bands to determine whether an undesired signal contribution may be present in one or more of the sub-bands. For example, sample analyzer 216 may employ coherent integration process (e.g., using a fast Fourier transform (FFT), discrete Fourier transform (DFT), etc.) and possibly a non-coherent integration process, along with an estimation process (e.g., using peak processing) to detect at least one undesired signal contribution. Here, for example, a peak processing technique may be used to identify candidate peaks having metrics which may be compared with one or more corresponding threshold values. For example, if a candidate peak presents a magnitude value that exceeds a threshold magnitude value then an undesired signal contribution may be detected as being present at a particular frequency and/or within a particular frequency band.

Thus, as illustrated sample analyzer 216 may, for example, identify one or more parameters 220 associated with a detected undesired signal contribution. For example, parameter(s) 220 may identify an estimated center frequency, an estimated power, and/or an estimated bandwidth associated with a detected undesired signal contribution.

As illustrated in the example of FIG. 2, one or more parameter(s) 220 (or other associated information or signals) may be provided to or otherwise obtained by notch filter 118 to affect filtering stage 204. Thus, for example, notch filter 118 may be set to an estimated center frequency and/or an estimated bandwidth associated with a detected undesired signal contribution.

In certain example implementations, detector 114, filtering stage 204 and/or notch filter 118 may, for example, also consider one or more of parameter(s) 220 to determine whether a notch filter 118 may be applied to address a given detected undesired signal contribution. Thus, for example, if there are a limited number of notch filters and a plurality of detected undesired signal contributions, it may be beneficial to address certain detected undesired signal contributions based on their estimated center frequency, estimated bandwidth, and/or estimated signal strength.

Attention is drawn next to FIG. 3, which is a schematic block diagram illustrating certain further detailed features of an example receiver 108' and detector 114', in accordance with an implementation.

Example receiver 108" comprises at least one antenna 302 coupled to an RF chain comprising an RF front-end 110, an intermediate frequency down converter (IFD) 304 and a decimation block 306. Thus, a received signal from antenna 302 may be converted to a digital signal by RF-front-end 110, digitally down converted (e.g., to a baseband frequency) by IFD 304, and decimated to a lower rate via decimation block 306.

The resulting sample data may then be provided, at point 201, to a pre-filtering stage which in this example comprises a pre-notch filter 308, a gain control 310 and equalization 312. Pre-notch filter 308, which may comprise a notch filter with a large bit-width at both the input and the output, may be provided which is capable of handling high dynamic signals but which also removes or reduces certain spurs. By way of example, pre-notch filter 308 may be designed to handle a first strongest undesired signal. Given the above characteristics, pre-notch filter 308 may consume more power than notch filter 118 and as such may be selectively enabled, for example, in response to an undesired signal contribution having a power that exceeds a threshold value is detected. The signal data from pre-notch filter 308 may then be scaled down by a scaler at gain control 310, e.g., to reduce a bit-width of the signal data.

After gain control 310, resulting signal data may be equalized by equalization block 312. Here, for example, a complex equalizer may be used to compensate for frequency variations in the RF and analog to digital conversion processing of RF front-end 110. The resulting signal data may then be provided to a filtering stage at point 203. Here, the filtering stage comprises at least one notch filter 118.

As mentioned with regard to FIG. 2, detector 114 may sample the signal data at different stages or points in its processing within baseband processor 112. Here in FIG. 3, as in FIG. 2, three possible points 201, 203 and 205 (e.g., taps, etc.) are illustrated. Hence, in certain example implementations, signal data may be selected from one particular point, while in other example implementations sample data may be selected from one or more particular points.

In the particular example implementation in FIG. 3, it is noted that it may be beneficial for detector 114 to sample the signal data at point 203 following equalization, since the flatness of the spectrum at this point in the processing may allow for the detector to be of a simpler design as there may be no further need to perform frequency equalization. In certain example implementations, it may be useful to have points prior to a notch filter(s) to possibly determine, e.g., while the notch filter(s) is activated, if a jammer(s) that is intended to be affected by the notch filter(s) is still present. If a jammer is no longer present, then a notch filter(s) may be deactivated or possibly reassigned to affect another jammer. In certain example implementations, if there is no point (e.g., tap) prior to a notch filter(s), then as an alternative access may be provided to a state(s) of the notch filter(s), wherein, for example, a higher or lower jammer power may be observable from a filter state. In other example implementations, it may be possible to temporarily disable a notch filter(s) to probe the signal spectrum to determine if a jammer(s) is still present, however, such approach may allow for some interference to affect operation (e.g., of a correlator, etc.) while such a check is performed. To determine whether notch filter 118 is operating effectively, it may be useful to sample signal data at point 205, and if appropriate make further adjustments to the operation of notch filter 118.

In the example implementation in FIG. 3, notch filter 118 comprises a plurality of notch filters. Each notch filter may be selectively initiated and/or otherwise operated to affect (e.g., attenuate, reduce, etc.) a detected undesired signal contribution. In certain example implementations, a notch filter may be programmed or otherwise operated based, at least in part, on one or more parameters 220 obtained from detector 114'. In certain example instances, a device may also comprise a plurality of pre-notch filters 308.

In the example implementation in FIG. 3, a post-filtering stage may comprise additional signal processing 316, e.g., as may be desired to provide data to a correlator 318.

In the example implementation of FIG. 3, detector 114' may estimate an undesired signal contribution's frequency, strength, and/or bandwidth, possibly sampled from at least one of points 201, 203, and 205 in receiver 108'. Here, for example, to select a sampling point and possibly a specific baseband processor 112 (FIG. 2) in receiver 108', a sample selector 212 (FIG. 2) may comprise multiplexer 330 or other like selection mechanism. As illustrated, by setting the values of a register SA_SRC_SEL, multiplexer 330 may select between points 201, 203, 205, of unrelated receivers, e.g., a WWAN or WLAN receiver, such that the detector may be shared by different technologies.

Should the bandwidth of the resulting selected signal data 331 be significantly large, to increase the resolution and reduce the FFT size in a sample analyzer 216 (FIG. 2), sub-band processing may be used. Thus, a desired signal bandwidth may be processed as a plurality of sub-bands. The sample analyzer 216 may thusly perform spectrum analysis on one or more sub-bands and possibly combine results for an entire desired band or some portion thereof.

With this in mind, the resulting selected signal data 331 may be provided to a sample preparer 214 (FIG. 2), which in this implementation may comprise a frequency converter 332 to bring the signal data to a "zero frequency" or "DC" (e.g., per SA_FREQ), an anti-aliasing filter (AAF) 334 programmed to filter out data not in a desired band and reduce noise via decimation (e.g., per SA_DEC_RATE), a scaler 336 to reduce the resulting bit width (e.g., per SA_SCALE), and a sample memory 338 (e.g., RAM) to store the prepared signal data for use by sampler analyzer 216 (FIG. 2). In detector 114', sample analyzer 216 (FIG. 2) may, for example, comprise a fine frequency rotation 340, a coherent integration 342 (e.g., an FFT, A DFT, etc.), a non-coherent integration 344, and a peak processing estimator 346.

Thus, in this example, selected signal data 331 is provided to frequency converter 332 which first rotates a desired sub-band to low frequency. Then, with AAF 334 the resulting signal data may be passed through a chain of anti-aliasing filters and decimators to keep only the relevant information in the desired sub-band. The decimation rate (SA_DEC_RATE) may be a programmable value.

The signal data output by the AAF 332 may comprise more bits than necessary. Thus, for example, to save memory, gain control 336 may be employed to scale down the samples (e.g., to reduce a bit width without incurring saturation or excessive quantization noise), which may then be stored in sample memory 338 a prepared signal data.

If the samples in sample memory 338 are used directly to perform the coherent integration 342, an undesired signal whose frequency lies exactly between two frequency bins of the power spectrum may experience a coherent loss (e.g., scalloping loss of 3.9 dB). This loss may be considered too large to allow in certain instances as it may lead to an increased integration time to compensate for such loss. To avoid such loss, multiple overlapping energy grids may be used. For example two overlapping frequency grids may reduce maximum coherent loss to 0.9 dB. Hence, in certain example instances, rather than using the chain 332-338 to collect an independent sample set for each energy grid, one may apply a fine frequency rotator 340 to a single data set to perform the frequency offset for each grid, which may provide for more efficient operation. With this technique, samples in sample memory 338 may be used as the input to coherent integration 342 to form even samples of the spectrum. In certain implementations, fine frequency rotator 340 may be used to rotate the samples in the sample memory 338 by a frequency equal to half of the frequency difference between the two frequency bins. The samples output by fine frequency rotator 340 may then be used as the input of coherent integration 342. The resulting energy may then be processed by peak processing estimator 346, e.g., to detect an undesired signal contribution and establish at least one parameter 220 associated therewith, e.g. an estimated center frequency, estimated power, and/or estimated bandwidth.

In certain example implementations, it may be beneficial to use detector 114/114' selectively, e.g., to conserve electrical power. Hence, detector 114/114' may be designed to be selectively activated in whole or part upon the occurrence of one or more triggering events. By way of example, detector 114/114' may be initiated by one or more triggering events relating to the device, receiver, or baseband processor being initiated (e.g., during a boot-up or power-ON process), and/or at the beginning of a session (e.g., when a receiver may perform a full band scan).

By way of example, detector 114/114' may be initiated by one or more triggering events relating to a new network interface transmit or receive channel being initiated. Since such an event might occur often, in some implementations, a caching or other like mechanism may be used such that the detector is not necessarily triggered upon each occurrence of an event but rather after a certain number of such events, a time following such an event or events, etc.

By way of example, detector 114/114' may be initiated by one or more triggering events relating to certain changes (e.g., drift) in locally maintained timing circuitry.

By way of example, detector 114/114' may be initiated by one or more triggering events relating to peak processing. For example, should a rate of peaks failing certain "jammer" tests exceed a threshold, detector 114/114' may be triggered to perform a scan.

By way of example, detector 114/114' may be initiated by one or more triggering events relating to a temporal measurement. For example, if the receiver state is ON and the time since the last scan time is greater than a predefined value then detector 114/114' may be triggered to perform a scan. If a pre-notch filter 308 is used, before performing a scan, detector 114' may selectively sample signal data at point 201 and perform a fast scan to see whether a particular (e.g., strong) undesired signal contribution is still present. Should such (strong) undesired signal contribution no longer be present, then detector 114' may signal or otherwise notify receiver 108' that pre-notch filter 308 may be turned-OFF to save power.

By way of example, detector 114/114' may be initiated by one or more triggering events relating to an "abnormal" power level of the signal data. For example, if an amplitude of the signal or an amplitude/power represented by signal data exceeds a threshold level then it may be assumed that there in an abnormal power level, and that an undesired signal contribution(s) power may be higher than a thermal noise power. Here, for example, detector 114/114' may be triggered to detect such undesired signal contribution(s).

Similar to the case of abnormal BP amplitude, if an estimated (mean) amplitude in one sub-band is high enough, an undesired signal power level in that sub-band may be higher than the noise floor in that sub-band, and detector 114/114' may be triggered to detect such undesired signal contribution(s). The method of using sub-band amplitude as a triggering mechanism may, for example, allow for detection of undesired signal contributions at lower power levels, e.g., using a decimation chain without using an FFT, non-coherent integration, and/or peak processing estimation.

In certain example implementations, parameters 220 may be stored in non-volatile memory or in some similar manner such that, upon re-starting a receiver one or more notch filters may be programmed based on the stored parameters. In certain example implementations, parameters 220 may be stored in volatile memory. Such parameters may also be stored with a timestamp or other like information that can be considered when re-starting a receiver and/or determining whether to trigger a detector 114/114'. In certain instances, such parameters may be associated with an estimated position and/or location, which may be considered when re-starting a receiver and/or determining whether to trigger a detector 114/114'. Parameters 220 may be updated over time, as a result of new scans.

To detect the undesired signal contribution and estimate its power correctly, one may first determine the background noise power. However, since the spectrum represented by signal data obtained by detector 114/114' may comprise both the power of the undesired signal contribution(s) and the background noise, it may be useful to estimate the background noise power. Since the undesired signal contributions tend to concentrate in certain frequency tones, one of the ways to do this is to approximate a mean of the background noise power with a median of the signal (e.g., undesired signal contributions plus noise).

By using a sorting method in a detector one may locate the median element. If the frequency range is large and the resolution required is high, such computation can be prohibitively large. However, a fast median filtering algorithm, for example, based on a quickselect algorithm, may be used in detector 114/114' to reduce processing time.

An example detection algorithm, which may be implemented in detector 114/114' is described below for a baseband processor. Here, a detection threshold may be chosen such that a probability of false alarm is $P_{EA}$. $P_{EA}$ may be sufficiently small such that a probability that a notch filter is unnecessarily assigned to an un-jammed frequency is low. However, one may not want $P_{EA}$ to be too small such that it would result in loss in sensitivity. Hence, there may be a trade-off to be made.

In this example, a variable B may represent a signal bandwidth at a detector input, and will likely vary depending on the device, etc.

Assuming that a decimator or other additional signal processing is programmed such that a bandwidth of each sub-band is $B_{sub}$, and the spectral efficiency of the decimation chain, which is the portion of the sub-band that can be used to detect undesired signal contributions, is η (e.g., which in practice may be <1), then the total number of sub-bands that should be used may be:

$$N_{sub} = \left\lceil \frac{B}{\eta B_{sub}} \right\rceil.$$

Let $N_{FFT}$ be the FFT size and the target $P_{FA}$ per frequency bin be $P_{FA,bin}$. Accordingly, there is the following relation:

$$(1-P_{FA,bin})^{N_{grid}\eta N_{FFT}N_{sub}} = 1-P_{FA}$$

thus, $P_{FA,bin}$ can be calculated as:

$$P_{FA,bin} = 1 - (1-P_{FA})^{\frac{1}{N_{grid}\eta N_{FFT}N_{sub}}}$$

where, $N_{grid}$ represents a number of overlapping grids, and $N_{sub}$ represents the number of sub-bands.

Figure 4:
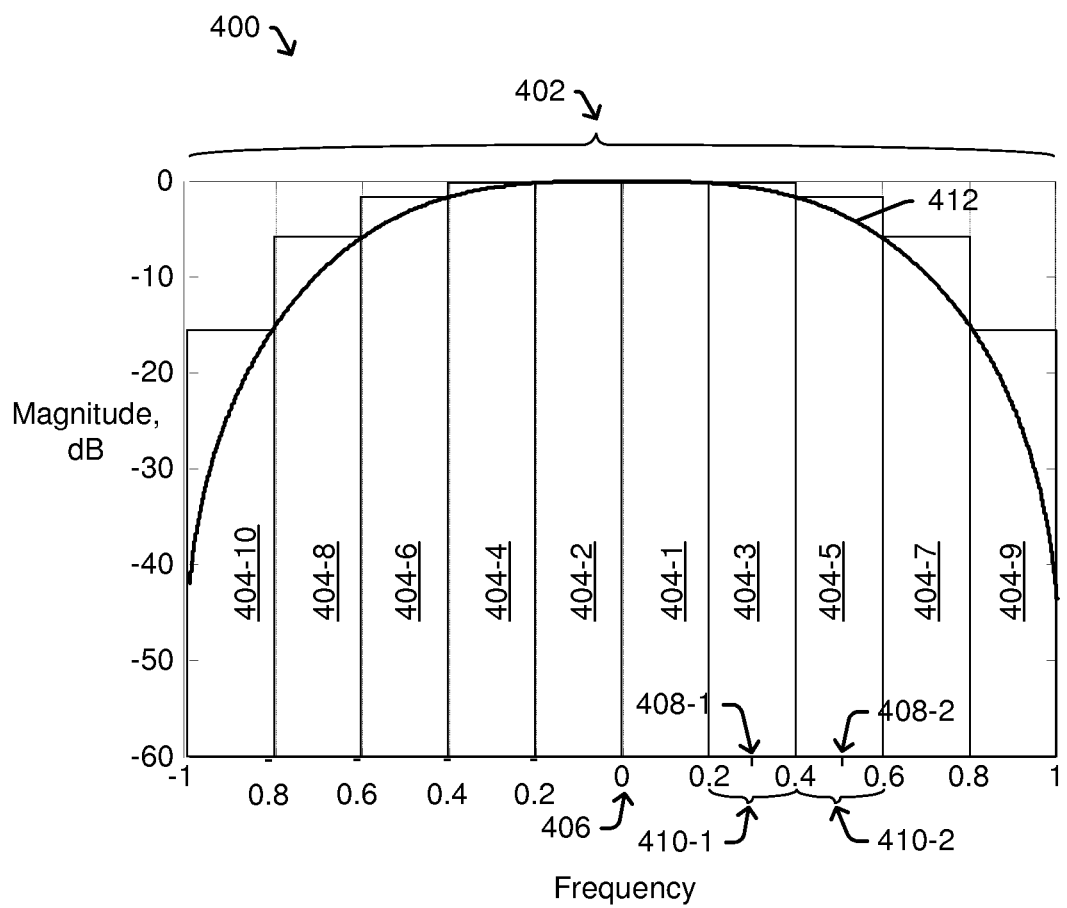
FIG. 4 is a graph illustrating an example spectral band associated with a selected frequency and operatively partitioned into a plurality of sub-bands, in accordance with an implementation.

Because of the frequency selectivity of the matched filter correlator, an undesired signal contribution at an edge of a signal bandwidth may not have as big an impact on the performance as might one at a lower frequency. Let $P_{min}$ be the lowest undesired signal level that one would like to detect at frequencies close to DC. The lowest undesired signal contribution level required to be detected in sub-band i may be calculated as:

$$P_{i,min}(dBm) = P_{min}(dBm) + D_i(dB),$$

where $D_i$ is a minimum signal droop level in sub-band i due to the chip-matched filter (e.g., as illustrated by line 412 in FIG. 4).

Since the required undesired signal contribution detection level may be different in each sub-band, different number of non-coherent integration may be used for each sub-band. Let $M_i$ be the number of non-coherent integration used in sub-band i. Each element on an energy grid has a chi-square distribution with $2M_i$ degrees of freedom. The distribution is central chi-square for bins with noise only and non-central chi-square for bins with both noise and undesired signal contributions. Thus, an example detection threshold can be calculated as $$\text{thresh}_i = Q(1-P_{FA,bin}, 2M_i)\sigma^2 \quad (1)$$

where Q is the inverse normalized central chi-square distribution function with $2M_i$ degrees of freedom, $2M_i\sigma^2$ is variance of the complex signal in each frequency bin. A function Q can be efficiently implemented using a lookup table or the like. The value of $2M_i\sigma^2$ can be estimated by using a median filter. It should be recognized that the example equations (1) and (3) shown herein pertain specifically to a square law detector, which is one example of an energy detector. In other example implementations, other detectors may be used (e.g., a linear detector and/or the like may be used), and as such different probability distributions would likely apply to such a detector.

An undesired signal to noise ratio per FFT bin at the output of one FFT, at the lowest undesired signal contribution level, may be calculated as:

$$P_{i,min,FFT}(dB) = P_{i,min} - kTo - NF(dB) - 10\log_{10}\frac{B_{sub}}{N_{FFT}}, dB \quad (2)$$

where k is Boltzmann's constant, To=290K, and NF is a worst case noise figure of the RF front-end. This equation assumes an antenna noise temperature is 290K, which is a standard condition for noise figure, and it is well known how to generalize it to other noise temperatures.

A probability of detection for the lowest undesired signal contribution input level may be calculated as:

$$P_{i,d} = 1 - F\left(\frac{\text{thresh}_i}{\sigma^2}, 2M_i, 2M_i 10^{\frac{P_{i,min,FFT}(dB)}{10}}\right), \quad (3)$$

where F is a cumulative distribution of a normalized non-central chi-square distribution with $2M_i$ degrees of freedom, and noncentrality parameter $$\lambda = 2M_i 10^{\frac{P_{i,min,FFT}(dB)}{10}}.$$

In this example, for detection it may be useful that the probability of detection $P_{i,d}$ for an undesired signal contribution tone be greater than a threshold value. As such, one may determine a number of non-coherent integration in sub-band i by attempting to increase the value of $M_i$ for each sub-band from 1, plugging in equations (1), (2) and (3) until $P_{i,d}$ is greater than the threshold value. A required number of non-coherent integration may be sufficiently smaller for sub-bands at the edge frequency, and hence such example scheme may be more useful than simply using a scheme having a fixed number of non-coherence integration across all the sub-bands.

In this example, to estimate accurately the power and frequency of the undesired signal contributions, once a jammer frequency has been determined coarsely, a higher resolution sub-band spectrum may be computed, centered at that jammer frequency. For example, once an undesired signal contribution is detected, a frequency converter may be re-programmed with the center frequency equal the undesired signal frequency. A decimation factor of the decimator may be set to its highest, which may lead to a small number of required non-coherent integration to interpolate a peak. With such decimation factor being set higher, a higher frequency resolution may be achieved.

Attention is drawn next to FIG. 4, which is graph 400 illustrating certain an example spectral band 402 associated with a selected frequency 406 and operatively partitioned into a plurality of sub-bands 404-1 through 404-10, in accordance with an implementation. As illustrated with regard to sub-bands 404-3 and 404-5, each sub-band is associated with it respective center frequency 408 and bandwidth 410. Here, for example, sub-band 404-3 has bandwidth 410-1 centered at center frequency 408-1, and sub-band 404-5 has bandwidth 410-2 centered at center frequency 408-2. In this illustrated example, sub-bands 404-3 and 404-5 are adjacent and do not overlap. In other example implementations, however, two or more sub-bands may overlap and/or even comprise one or more other sub-bands therein. For example, an overlap fraction may be 1-η. In this illustrated example, sub-bands 404-1 through 404-10 each have equal bandwidths. In other example implementations, however, two or more sub-bands may have different bandwidths.

Because of the sinc ^2 shape (see line 412) in frequency domain of a rectangular SPS chip, a low frequency undesired signal contribution may have a more detrimental impact on a receiver's performance than one with a higher frequency. Thus, it may be desirable to scan for and detect undesired signal contributions with lower frequencies first. This may be done, for example, by instructing detector 114/114' to scan sub-bands in a particular scan order. For example, in one scan order, low frequency sub-bands may be scanned first and then scans may progressively continue toward the edge sub-bands. An example, of one such scan order is illustrated in FIG. 4 by the numerical ordering of sub-bands 404-1 through 404-10. Here, for example, sub-bands 404-1 and 404-2 cover the lowest frequencies with respect to a selected frequency 406, and as such may be scanned first followed in accordance with their numerical order with sub-bands 404-3, 404-4, 404-5, 404-6, 404-7, 404-8, 404-9, and finally 404-10. In certain instances (e.g., in a frequency division multiplexed SPS such as GLONASS), a scan order may also be affected and/or otherwise based in some manner based on one or more channels which are being tracked (e.g., channels that are being tracked may have a higher priority in a scan order).

Figure 5:
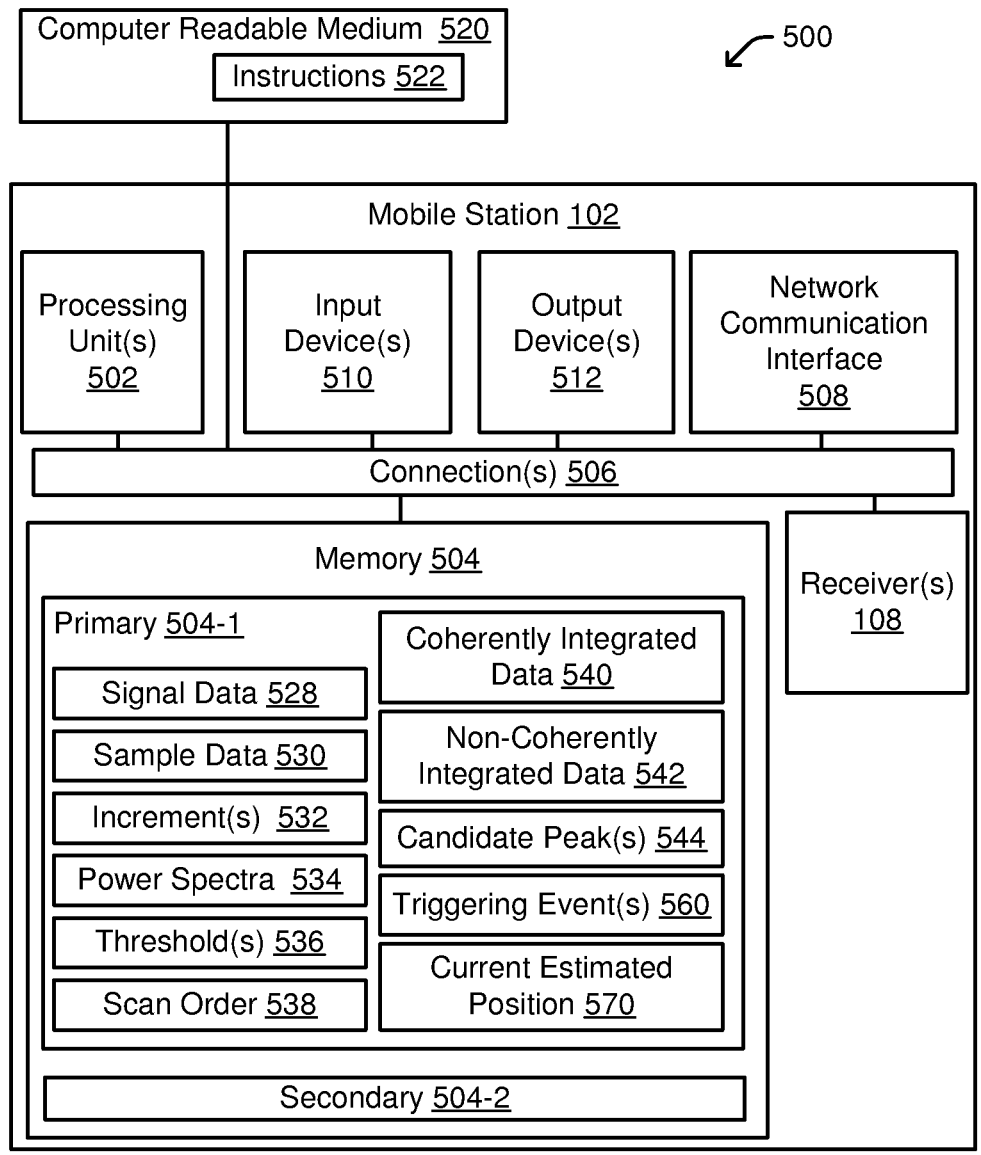
FIG. 5 is a schematic block diagram illustrating certain further features of a device in the form of an example mobile station, as in FIG. 1, in accordance with an implementation.

FIG. 5 shows a specific apparatus 500 in the form of a mobile station 102 which may act, at least in part, to detect one or more undesired signals that may interfere with the reception of one or more desired signals, in accordance with an implementation. As illustrated in this example, apparatus 500 may receive and process a desired signal contribution (e.g., SPS signals 105 (FIG. 1)) via at least one receiver 108.

As illustrated in FIG. 5, example mobile station 102 may comprise one or more processing units 502, memory 504, connections 506, network communication interface 508, one or more user input devices 510, and one or more user output devices 512.

As shown, memory 504 may comprise a primary memory 504-1, and/or a secondary memory 504-2. Here, for example, primary memory 504-1 is illustrated as storing information and/or instructions relating to signal data 528, various forms of sample data 530, sub-band increment(s) 532, power spectra 534, threshold(s) 536, a scan order 538, coherently integrated data 540, non-coherently integrated data 542, candidate peak(s) 544, triggering event(s) 560, and/or a current estimated position 570, which may be accessed/provided or otherwise executed by processing unit(s) 502. Memory 504 may store instructions for receiver 108 and/or detector 114 that may be executed by processing unit(s) 502.

As illustrated, mobile station 102 may take the form of a specific computing device comprising one or more processing units 502 to perform data processing (e.g., in accordance with all or part of the techniques provided herein) coupled to memory 504 via one or more connections 506. Processing unit(s) 502 may be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 504 may be representative of any data storage mechanism. Memory 504 may include, for example, primary memory 504-1 and/or secondary memory 504-2. Primary memory 504-1 may comprise, for example, a random access memory, read only memory, non-volatile memory, etc. While illustrated in this example as being separate from the processing units, it should be understood that all or part of a primary memory may be provided within or otherwise co-located/coupled with processing unit(s) 502, or other like circuitry within mobile station 102. Secondary memory 504-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, non-transitory computer readable medium 520. As illustrated, memory 504 and/or computer readable medium 520 may comprise computer executable instructions 522 associated with data/signal processing (e.g., in accordance with the techniques provided herein).

In certain example implementations, as illustrated, mobile station 102 may further comprise one or more user input devices 510 (e.g., keyboard, touch screen, a microphone, a camera, etc.) and/or one or more user output devices 512 (e.g., a display, a projector, a speaker, etc.). Hence, for example, navigation function related information (e.g., location based service information, maps, etc.) may be presented to the user via some form of user output. Also, user input may be received which relates to a navigation function or other capabilities via the user input device(s) 510.

Although not illustrated, it should be understood that mobile station 102 may be enabled to perform a variety of tasks, some or many of which may be unrelated to location based services and/or other like position estimation capabilities.

Figure 6:
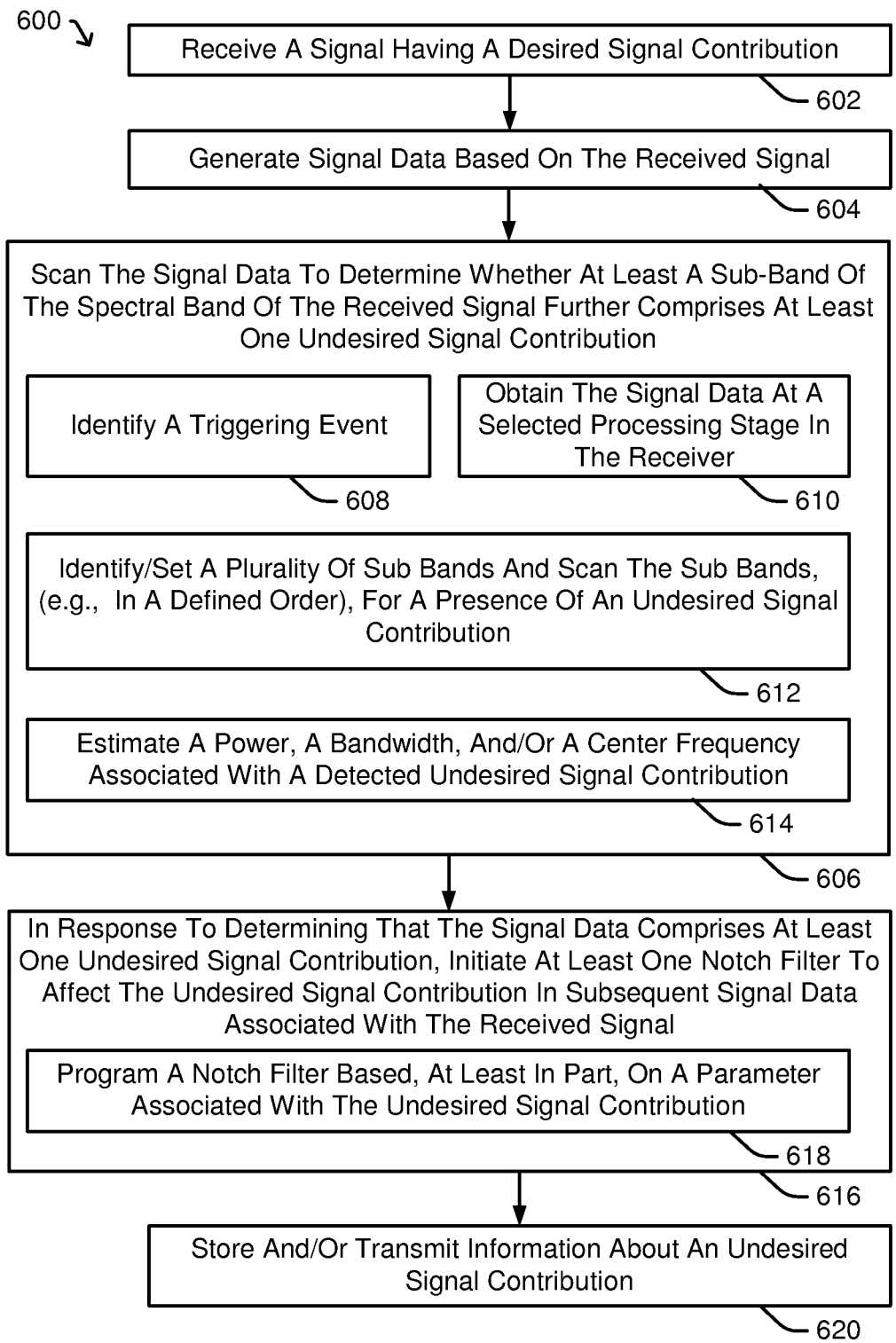
FIG. 6 is a flow diagram illustrating certain features of an example process for use in a device to detect and filter one or more undesired signals that may interfere with the reception of one or more desired signals, in accordance with an implementation.

Reference is made now to FIG. 6, which is a flow diagram illustrating certain features of an example process 600 for use in a mobile station 102 to detect one or more undesired signals which may interfere with the reception of one or more desired signals, in accordance with an implementation.

At block 602 a signal may be received having at least one desired signal contribution and possibly one or more undesired signal contributions. At block 604, signal data may be generated or otherwise established based on the received signal. Here, for example, an RF front-end 110 (FIG. 1) may receive an RF signal and establish corresponding digital signal information in the form of signal data.

At block 606, it may be determined whether signal data associated with at least a portion of a spectral band further comprises at least one undesired signal contribution by actively scanning a spectral band of the received signal. In certain example implementations, at block 608, a triggering event may be identified which initiates such a determination process. In certain example implementations, at block 610, signal data may be obtained from or at a selected processing stage in a receiver. In certain example implementations, at block 612, a plurality of sub-bands may identified and scanned, e.g., in a defined order, for a presence of an undesired signal contribution. In certain example implementations, at block 614, one or more parameters, e.g., an estimated power, an estimated bandwidth, and/or an estimated center frequency, associated with a detected undesired signal contribution may be established.

At block 616, in response to determining that the signal data comprises at least one undesired signal contribution, at least one notch filter may be operatively initiated to affect the undesired signal contribution in subsequent signal data associated with the received signal. Here, for example at block 618, a notch filter may be programmed based, at least in part, on at least one parameter associated with at least one detected undesired signal contribution.

At block 620, which is optional, information (e.g., one or more parameters) about one or more detected undesired signal contributions may be stored and/or transmitted. In certain instances, such information may also comprise information regarding the mobile station and the detected undesired signal contribution (e.g., a time or time period relating to the detection, a triggering event leading to the detection, an estimated position or location relating to the detection).

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "classifying", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a device comprising a receiver:
scanning at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on: a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
in response to determining that said signal data in said at least one sub-band comprises said at least one undesired signal contribution, initiating at least one notch filter within the receiver to affect said at least one undesired signal contribution.

2. The method as recited in claim 1, wherein said scanning further comprises setting: a bandwidth of one or more of said plurality of sub-bands; a center frequency of one or more of said plurality of sub-bands; an integration time for one or more of said plurality of sub-bands; or a combination thereof.

3. The method as recited in claim 1, wherein said scanning further comprises:
selecting said at least one sub-band; and
estimating a center frequency for said at least one undesired signal contribution.

4. The method as recited in claim 3, wherein said scanning further comprises:
selecting said at least one sub-band;
collecting signal samples in said selected sub-band;
applying Fourier analysis to said signal samples to generate a power spectrum for said selected sub-band; and
applying peak processing to said power spectrum to estimate one or more parameters for said at least one undesired signal contribution in said selected sub-band.

5. The method as recited in claim 3, wherein said estimating said center frequency further comprises:
non-coherently combining one or more power spectra for said at least one sub-band; and
applying a threshold to said combined power spectra.

6. The method as recited in claim 1, wherein two of said plurality of sub-bands are at least partially overlapping.

7. The method as recited in claim 1, wherein at least two of said plurality of sub-bands have different center frequencies and equal bandwidth sizes.

8. The method as recited in claim 1, wherein said spectral band is consumed by said plurality of sub-bands.

9. The method as recited in claim 1, and further comprising, at said device: obtaining said signal data from at least one of a plurality of different processing stages in said receiver.

10. The method as recited in claim 1, wherein said signal data is obtained either before or after a filtering stage comprising said at least one notch filter.

11. The method as recited in claim 1, wherein said desired signal contribution comprises a satellite positioning system (SPS) signal.

12. The method as recited in claim 1, wherein said at least one undesired signal contribution comprises a continuous wave signal that interferes with said desired signal.

13. The method as recited in claim 1, wherein said scanning is initiated in response to one or more triggering events.

14. The method as recited in claim 13, wherein said one or more triggering events comprises at least one of: a device or session initiation event; an new channel initiation event; a time-based event; a frequency drift event; an initiated scan event; or a signal data threshold event.

15. The method as recited in claim 1, and further comprising, at said device: determining at least one parameter for said at least one undesired signal contribution.

16. The method as recited in claim 15, wherein said at least one parameter is indicative of at least one of: an estimated power, an estimated bandwidth, or an estimated center frequency for said at least one undesired signal contribution.

17. The method as recited in claim 15, and further comprising, at said device:
storing said at least one parameter in memory; and
subsequently programming said at least one notch filter based, at least in part, on said stored parameter.

18. The method as recited in claim 15, and further comprising, at said device: transmitting said at least one parameter to at least one other device.

19. The method as recited in claim 18, and further comprising, at said device: transmitting a current estimated position of said device to said at least one other device.

20. An apparatus comprising:
means for scanning at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on: a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
means for initiating at least one notch filter within a receiver to affect said at least one undesired signal contribution, in response to determining that said signal data in said at least one sub-band comprises said at least one undesired signal contribution.

21. The apparatus as recited in claim 20, and further comprising at least one of:
means for setting a bandwidth of one or more of said plurality of sub-bands;
means for setting a center frequency of one or more of said plurality of sub-bands; or
means for setting an integration time for one or more of said plurality of sub-bands.

22. The apparatus as recited in claim 20, wherein said means for scanning further comprises:
means for selecting said at least one sub-band; and
means for estimating a center frequency for said at least one undesired signal contribution.

23. The apparatus as recited in claim 22, wherein said estimating said center frequency further comprises:
- non-coherently combining one or more power spectra for said at least one sub-band; and
- applying a threshold to said combined power spectra.

24. The apparatus as recited in claim 20, wherein said scanning further comprises:
- means for selecting said at least one sub-band;
- means for collecting signal samples in said selected sub-band;
- means for applying Fourier analysis to said signal samples to generate a power spectrum for said selected sub-band; and
- means for applying peak processing to said power spectrum to estimate one or more parameters for said at least one undesired signal contribution in said selected sub-band.

25. The apparatus as recited in claim 20, wherein two of said plurality of sub-bands are at least partially overlapping.

26. The apparatus as recited in claim 20, wherein at least two of said plurality of sub-bands have different center frequencies and equal bandwidth sizes.

27. The apparatus as recited in claim 20, wherein said spectral band is consumed by said plurality of sub-bands.

28. The apparatus as recited in claim 20, and further comprising: means for obtaining said signal data from at least one of a plurality of different processing stages in said receiver.

29. The apparatus as recited in claim 20, wherein said desired signal contribution comprises a SPS signal.

30. The apparatus as recited in claim 20, wherein said at least one undesired signal contribution comprises a continuous wave signal that interferes with said desired signal.

31. The apparatus as recited in claim 20, wherein said scanning is initiated in response to one or more triggering events.

32. The apparatus as recited in claim 31, wherein said one or more triggering events comprises at least one of: a device or session initiation event; an new channel initiation event; a time-based event; a frequency drift event; an initiated scan event; or a signal data threshold event.

33. The apparatus as recited in claim 20, and further comprising: means for determining at least one parameter for said at least one undesired signal contribution.

34. The apparatus as recited in claim 33, wherein said at least one parameter is indicative of at least one of: an estimated power, an estimated bandwidth, or an estimated center frequency for said at least one undesired signal contribution.

35. The apparatus as recited in claim 33, and further comprising:
- means for storing said at least one parameter in memory; and
- means for subsequently programming said at least one notch filter based, at least in part, on said stored parameter.

36. The apparatus as recited in claim 33, and further comprising:
- means for transmitting said at least one parameter to at least one other device.

37. A device comprising:
- a receiver; and
- at least one processing unit to:
  - scan at least one sub-band of a plurality of sub-bands within a spectral band of a signal received via said receiver, said received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on: a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
  - in response to determining that said signal data in said at least one sub-band comprises said at least one undesired signal contribution, initiate at least one notch filter within said receiver to affect said at least one undesired signal contribution.

38. The device as recited in claim 37, said at least one processing unit to further set:
- a bandwidth of one or more of said plurality of sub-bands;
- a center frequency of one or more of said plurality of sub-bands;
- an integration time for one or more of said plurality of sub-bands; or
- a combination thereof.

39. The device as recited in claim 37, said at least one processing unit to further:
- select said at least one sub-band; and
- estimate a center frequency for said at least one undesired signal contribution.

40. The device as recited in claim 39, said at least one processing unit to further:
- select said at least one sub-band;
- collect signal samples in said selected sub-band;
- apply Fourier analysis to said signal samples to generate a power spectrum for said selected sub-band; and
- apply peak processing to said power spectrum to estimate one or more parameters for said at least one undesired signal contribution in said selected sub-band.

41. The device as recited in claim 39, said at least one processing unit to further:
- non-coherently combine one or more power spectra for said at least one sub-band; and
- apply a threshold to said combined power spectra.

42. The device as recited in claim 37, wherein two of said plurality of sub-bands are at least partially overlapping.

43. The device as recited in claim 37, wherein at least two of said plurality of sub-bands have different center frequencies and equal bandwidth sizes.

44. The device as recited in claim 37, wherein said spectral band is consumed by said plurality of sub-bands.

45. The device as recited in claim 37, said at least one processing unit to further: obtain said signal data from at least one of a plurality of different processing stages in said receiver.

46. The device as recited in claim 37, wherein said signal data is obtained either before or after a filtering stage comprising said at least one notch filter.

47. The device as recited in claim 37, wherein said desired signal contribution comprises a SPS signal.

48. The device as recited in claim 37, wherein said at least one undesired signal contribution comprises a continuous wave signal that interferes with said desired signal.

49. The device as recited in claim 37, said at least one processing unit to further: initiate said scan in response to one or more triggering events.

50. The device as recited in claim 49, wherein said one or more triggering events comprises at least one of: a device or session initiation event; an new channel initiation event; a time-based event; a frequency drift event; an initiated scan event; or a signal data threshold event.

51. The device as recited in claim 37, said at least one processing unit to further: determine at least one parameter for said at least one undesired signal contribution.

52. The device as recited in claim 51, wherein said at least one parameter is indicative of at least one of: an estimated power, an estimated bandwidth, or an estimated center frequency for said at least one undesired signal contribution.

53. The device as recited in claim 51, and further comprising:
memory; and wherein said at least one processing unit to further:
initiate storage of said at least one parameter in said memory; and
subsequently program said at least one notch filter based, at least in part, on said stored parameter.

54. The device as recited in claim 51, and further comprising:
a communication interface; and wherein said at least one processing unit to further:
initiate transmission of said at least one parameter to at least one other device via said communication interface.

55. The device as recited in claim 54, said at least one processing unit to further:
initiate transmission of a current estimated position of said device to said at least one other device via said communication interface.

56. An article for use in a device comprising a receiver and a processing unit, the article comprising:
a non-transitory computer readable medium having stored therein computer-implementable instructions executable by said processing unit to:
scan at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on: a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
in response to a determination that said signal data in said at least one sub-band comprises said at least one undesired signal contribution, initiate at least one notch filter within the receiver to affect said at least one undesired signal contribution.

57. The article as recited in claim 56, wherein said computer-implementable instructions are further executable by said processing unit to set:
a bandwidth of one or more of said plurality of sub-bands;
a center frequency of one or more of said plurality of sub-bands;
an integration time for one or more of said plurality of sub-bands; or
a combination thereof.

58. The article as recited in claim 56, wherein said computer-implementable instructions are further executable by said processing unit to:
select said at least one sub-band; and
estimate a center frequency for said at least one undesired signal contribution.

59. The article as recited in claim 58, wherein said computer-implementable instructions are further executable by said processing unit to:
select said at least one sub-band;
collect signal samples in said selected sub-band;
apply Fourier analysis to said signal samples to generate a power spectrum for said selected sub-band; and
apply peak processing to said power spectrum to estimate one or more parameters for said at least one undesired signal contribution in said selected sub-band.

60. The article as recited in claim 58, wherein said computer-implementable instructions are further executable by said processing unit to:
non-coherently combine one or more power spectra for said at least one sub-band; and
apply a threshold to said combined power spectra.

61. The article as recited in claim 56, wherein two of said plurality of sub-bands are at least partially overlapping.

62. The article as recited in claim 56, wherein at least two of said plurality of sub-bands have different center frequencies and equal bandwidth sizes.

63. The article as recited in claim 56, wherein said spectral band is consumed by said plurality of sub-bands.

64. The article as recited in claim 56, wherein said computer-implementable instructions are further executable by said processing unit to: obtain said signal data from at least one of a plurality of different processing stages in the receiver.

65. The article as recited in claim 56, wherein said signal data is obtained either before or after a filtering stage comprising said at least one notch filter.

66. The article as recited in claim 56, wherein said desired signal contribution comprises a SPS signal.

67. The article as recited in claim 56, wherein said at least one undesired signal contribution comprises a continuous wave signal that interferes with said desired signal.

68. The article as recited in claim 56, wherein said computer-implementable instructions are further executable by said processing unit to initiate said scan in response to one or more triggering events.

69. The article as recited in claim 68, wherein said one or more triggering events comprises at least one of: a device or session initiation event; an new channel initiation event; a time-based event; a frequency drift event; an initiated scan event; or a signal data threshold event.

70. The article as recited in claim 56, wherein said computer-implementable instructions are further executable by said processing unit to: determine at least one parameter for said at least one undesired signal contribution.

71. The article as recited in claim 70, wherein said at least one parameter is indicative of at least one of: an estimated power, an estimated bandwidth, or an estimated center frequency for said at least one undesired signal contribution.

72. The article as recited in claim 70, wherein said computer-implementable instructions are further executable by said processing unit to:
store said at least one parameter in memory; and
subsequently program said at least one notch filter based, at least in part, on said stored parameter.

73. The article as recited in claim 70, wherein said computer-implementable instructions are further executable by said processing unit to: initiate transmission of said at least one parameter to at least one other device.

74. The article as recited in claim 73, wherein said computer-implementable instructions are further executable by said processing unit to: initiate transmission of a current estimated position of the device to said at least one other device.

75. A method comprising, at a device comprising a receiver:
scanning at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on a ranking of said plurality of sub-bands based on use in channel tracking, wherein a sub-band that is being used in said channel tracking has a higher rank than another sub-band that is not being used in said channel tracking, and wherein said at least one sub-band is further selected for said scanning based, at least in part, on a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
in response to determining that said signal data in said at least one sub-band comprises said at least one undesired signal contribution, initiating at least one notch filter within the receiver to affect said at least one undesired signal contribution.

76. The method as recited in claim 75, and further comprising, at said device:
determining at least one parameter based, at least in part, on said at least one undesired signal contribution; and
programming said at least one notch filter based, at least in part, on said at least one parameter.

77. An apparatus comprising:
means for scanning at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on a ranking of said plurality of sub-bands based on use in channel tracking, wherein a sub-band that is being used in said channel tracking has a higher rank than another sub-band that is not being used in said channel tracking, and wherein said at least one sub-band is further selected for said scanning based, at least in part, on a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
means for initiating at least one notch filter within a receiver to affect said at least one undesired signal contribution, in response to a determination that said signal data in said at least one sub-band comprises said at least one undesired signal contribution.

78. The apparatus as recited in claim 77, and further comprising:
means for determining at least one parameter based, at least in part, on said at least one undesired signal contribution; and
means for programming said at least one notch filter based, at least in part, on said at least one parameter.

79. A device comprising:
a receiver;
at least one processing unit to:
scan at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on a ranking of said plurality of sub-bands based on use in channel tracking, wherein a sub-band that is being used in said channel tracking has a higher rank than another sub-band that is not being used in said channel tracking, and wherein said at least one sub-band is further selected for said scanning based, at least in part, on a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
in response to a determination that said signal data in said at least one sub-band comprises said at least one undesired signal contribution, initiate at least one notch filter within said receiver to affect said at least one undesired signal contribution.

80. The device as recited in claim 79, said at least one processing unit to further:
determine at least one parameter based, at least in part, on said at least one undesired signal contribution; and
program said at least one notch filter based, at least in part, on said at least one parameter.

81. An article for use in a device comprising a receiver and a processing unit, the article comprising:
   a non-transitory computer readable medium having stored therein computer-implementable instructions executable by the processing unit to:
      scan at least one sub-band of a plurality of sub-bands within a spectral band of a received signal comprising a desired signal contribution to determine whether signal data obtained from said at least one sub-band further comprises at least one undesired signal contribution, wherein said at least one sub-band is selected for scanning based, at least in part, on a scan order that prioritizes scanning of said plurality of sub-bands based, at least in part, on a ranking of said plurality of sub-bands based on use in channel tracking, wherein a sub-band that is being used in said channel tracking has a higher rank than another sub-band that is not being used in said channel tracking, and wherein said at least one sub-band is further selected for said scanning based, at least in part, on a ranking in increasing order of differences between a center frequency of said spectral band and respective center frequencies of each of said plurality of sub-bands, wherein said respective center frequencies of a first portion of said plurality of sub-bands are greater than said center frequency of said spectral band, and said respective center frequencies of a second portion of said plurality of sub-bands are less than said center frequency of said spectral band, and wherein at least a part of said ranking in increasing order alternates between sub-bands of said first portion and sub-bands of said second portion; and
      in response to a determination that said signal data in said at least one sub-band comprises said at least one undesired signal contribution, initiate at least one notch filter within the receiver to affect said at least one undesired signal contribution.

82. The article as recited in claim 81, wherein said computer-implementable instructions are further executable by the processing unit to:
   determine at least one parameter based, at least in part, on said at least one undesired signal contribution; and
   program said at least one notch filter based, at least in part, on said at least one parameter.

* * * * *